(12) United States Patent
Zhang et al.

(10) Patent No.: US 6,968,557 B1
(45) Date of Patent: Nov. 22, 2005

(54) REDUCING STACK MEMORY RESOURCES IN A THREADED COMPUTER SYSTEM

(75) Inventors: Hong Zhang, Sunnyvale, CA (US); Sheng Liang, Cupertino, CA (US); Rajiv Mirani, Los Gatos, CA (US); Abhishek Chauhan, Los Gatos, CA (US)

(73) Assignee: Stratum8 Corporation, Sunnyvale, CA (US)

( * ) Notice: Subject to any disclaimer, the term of this patent is extended or adjusted under 35 U.S.C. 154(b) by 394 days.

(21) Appl. No.: 09/740,661

(22) Filed: Dec. 18, 2000

(51) Int. Cl.[7] .............................................. G06F 9/00
(52) U.S. Cl. ................... 719/319; 711/119; 712/202; 718/104
(58) Field of Search ............................... 709/312, 315, 709/316, 318, 321, 328, 201–203, 217, 226; 711/132, 119, 117; 712/202; 719/319; 718/104, 107, 108

(56) References Cited

U.S. PATENT DOCUMENTS

| | | | | |
|---|---|---|---|---|
| 5,701,470 A | * | 12/1997 | Joy et al. ................. | 707/103 R |
| 5,727,178 A | | 3/1998 | Pletcher et al. .............. | 395/412 |
| 5,752,249 A | * | 5/1998 | Macon et al. ........... | 707/103 R |
| 5,765,157 A | | 6/1998 | Lindholm et al. ........... | 707/101 |
| 5,835,958 A | | 11/1998 | Long et al. ................... | 711/170 |
| 5,928,323 A | * | 7/1999 | Gosling et al. ............. | 709/203 |
| 6,026,485 A | * | 2/2000 | O'Connor et al. .......... | 712/226 |
| 6,081,665 A | * | 6/2000 | Nilsen et al. ................ | 717/116 |
| 6,105,067 A | | 8/2000 | Batra .......................... | 709/227 |
| 6,125,439 A | * | 9/2000 | Tremblay et al. ........... | 712/202 |
| 6,199,075 B1 | * | 3/2001 | Ungar et al. ................. | 707/206 |
| 6,263,491 B1 | * | 7/2001 | Hunt .......................... | 717/130 |
| 6,317,869 B1 | * | 11/2001 | Adl-Tabatabai et al. .... | 717/132 |
| 6,370,620 B1 | * | 4/2002 | Wu et al. ................... | 711/132 |
| 6,374,286 B1 | * | 4/2002 | Gee et al. ................... | 709/108 |
| 6,381,735 B1 | * | 4/2002 | Hunt .......................... | 717/158 |
| 6,505,344 B1 | * | 1/2003 | Blais et al. ................. | 717/151 |
| 6,542,920 B1 | * | 4/2003 | Belkin et al. ............... | 709/104 |

* cited by examiner

*Primary Examiner*—John Follansbee
*Assistant Examiner*—Haresh Patel
(74) *Attorney, Agent, or Firm*—Fenwick & West LLP (57) ABSTRACT

A computer thread utilizes an auxiliary stack resource to execute program code function calls requiring substantial stack memory resources. In a wrapper embodiment, portions of the program code having function calls requiring substantial stack resources are wrapped in a wrapper that calls an auxiliary stack resource for executing the function call and returns the auxiliary stack resource when the function call is completed. In one embodiment, the stack memory allocated to the thread is selected to accommodate a first class of function calls requiring comparatively low amounts of stack memory and the auxiliary stack resource is called to accommodate the requirements of a second class of function calls requiring comparatively large amounts of stack memory. The allocation of stack memory according to the requirements of function calls allows for multiple computing tasks, such as those carried out by Internet websites and services, to be carried out more efficiently.

34 Claims, 11 Drawing Sheets

REDUCING STACK MEMORY RESOURCES IN A THREADED COMPUTER SYSTEM

BACKGROUND OF THE INVENTION

1. Field of the Invention

The present invention relates generally to scalable network computing services using computing threads. More particularly, the present invention is directed towards lightweight computing threads for scalable Internet services.

2. Description of Background Art

Many Internet web-sites and services use computer thread techniques to handle a large number of simultaneous user sessions. An individual thread is an independent unit of computation that forms a sequential execution stream. In many network applications a thread corresponds to the information required to serve one individual user or a particular service request. The request, in turn, may include one or more function calls that are part of a code segment for performing the request. A thread scheduler is typically used to select a thread to be executed from a ready list of active threads.

Threads may be scheduled based upon a prioritized list or by an un-prioritized round-robin technique.

A thread typically utilizes a hardware register, stack pointers, scheduling information, address space stack space, interrupt vectors, and other resources, depending upon the system. Execution of threads can be switched by saving values of CPU registers and other key data.

A thread uses stack, CPU register, and CPU time resources to execute a process. Threads are classified by their "weight." The weight of a thread corresponds to the amount of context that must be saved when a thread is removed from a processor and later restored. So-called lightweight threads include functionality for creating, deleting, scheduling, and synchronizing threads in a shared memory environment.

Highly parallel programs sometimes use a thread-pool. A thread-pool is a collection of N threads that are used repeatedly to run small tasks. The threads execute in the same memory space, and can therefore work concurrently on shared data. A thread-pool thus serves as threading service in which a request from an interface is handed off to thread in the thread-pool.

Conventional thread techniques offer many advantages for multi-tasking a large number of user-sessions. However, network based services may be required to handle large numbers of concurrent user sessions. For example, a popular web-site may have to have the capacity to handle millions of concurrent user sessions. A firewall or proxy box may have to handle large numbers of concurrent connections. Streaming media and media servers may have to serve a large number of audio and video streams corresponding to a large number of smaller processes.

A cost-effective network service is scalable, i.e., can be adapted to handle large numbers of concurrent user sessions, connections, or processes for a given amount of memory resources. Scalability for a large Internet server may be associated with the server having the capacity to handle millions of sessions, i.e., doubling the server memory resources permits twice as many sessions. However, scalability can also refer to the ability of a device with limited memory resources to handle a large number of sessions relative to the memory resources of the device. For example, some compact network appliances have limited memory resources in order to reduce the size and cost of the network appliance. However, in the context of a scalable network appliance the appliance should handle a large number of user sessions in proportion to the memory resources of the network appliance, i.e., a memory appliance with one-hundredth the memory resources of a large Internet server preferably handles a proportionately reduced number of simultaneous sessions.

Conventional thread techniques are not as scalable as desired. An active thread may exist in several different states. The thread may be running a computational function using the CPU. Alternately, a thread may be waiting for another operation to occur, such as an input/output function. This is sometimes known as a "blocked" thread because the thread is active but waiting for non-CPU resources to complete its task. A blocked thread consumes memory, file descriptor, and other resources but is unavailable to run code for other active sessions.

A system in which the threads are (on average) blocked for a significant fraction of their process time will require more threads to handle a given number of users. There are methods to switch from blocked threads to other threads. However, if context switches are performed, each context switch also consumes system resources. Each context switch has a system cost that is proportional to the size of the root thread context. The system cost of a context switch can be reduced, somewhat, by using a cooperative threading model in which many of the entries in the register set do not need to be saved and restored. Storage of thread context also consumes stack memory resources. Threads are typically allotted a significant amount of virtual stack address space (e.g., 1 MB on the Win32 and 2 MB on Solaris) so that each thread has the stack memory resource required to handle the functional calls in a session request.

Figure 1:
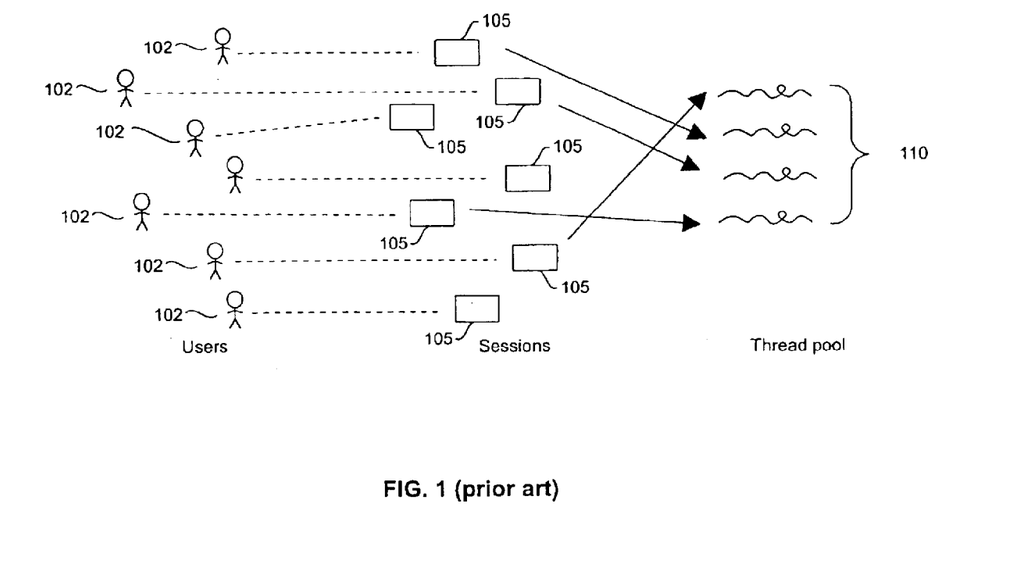
FIG. 1 illustrates a prior art thread pool for executing user sessions.

FIG. 1 is an illustrative diagram of a prior art thread based approach to map every user session onto a thread. Each user 102 has an outstanding user session 105, e.g., each user may be requesting information or viewing pages from a web-site. Each user session 105 is mapped onto a thread in a thread pool 110 using a thread pooling mechanism (not shown in FIG. 1). Note that not all sessions are active at any given time. A session is active only when it is carrying out a new task on the behalf of a user.

For example, when a web email user clicks the "Check New Mail" button of an e-mail client, the user's session become active while checking for the availability of new e-mails. However, when a user is merely passively reading messages the e-mail session is not active. As a result, only active sessions need to be mapped to a thread. Consequently, as shown in FIG. 1, there can be more users 102 than threads 110.

Thread-based sessions work well for services in which there are comparatively small I/O delays to finish a thread session. As one example, thread-based sessions work well in web servers that serve static web pages from a disk. Each user session 105 for receiving a static web page is a request that causes a thread 110 to read the requested data from the disk and serve the data to the client. A disk read operation for a static web page is completed comparatively quickly so that requests for static web pages can be served in a short amount of time, i.e., the I/O delays are comparatively small.

However, thread-based sessions to not work well for services, such as web-proxies, where the threads are blocked for significant periods of time because of input-output (I/O) operations. A web proxy is used as an intermediary between a client and an upstream server. In a typical situation, a request from the client causes the proxy to issue a request to the upstream server. The proxy then waits for a response to come back from the upstream server before issuing a response to the client. While the web proxy waits for the response to come back from the upstream server it blocks an I/O operation for an undetermined length of time. Extra threads are required to handle a given number of sessions, increasing the stack memory resources required for the threads. Note also that there are substantial system costs if a context switch is performed.

Figure 3:
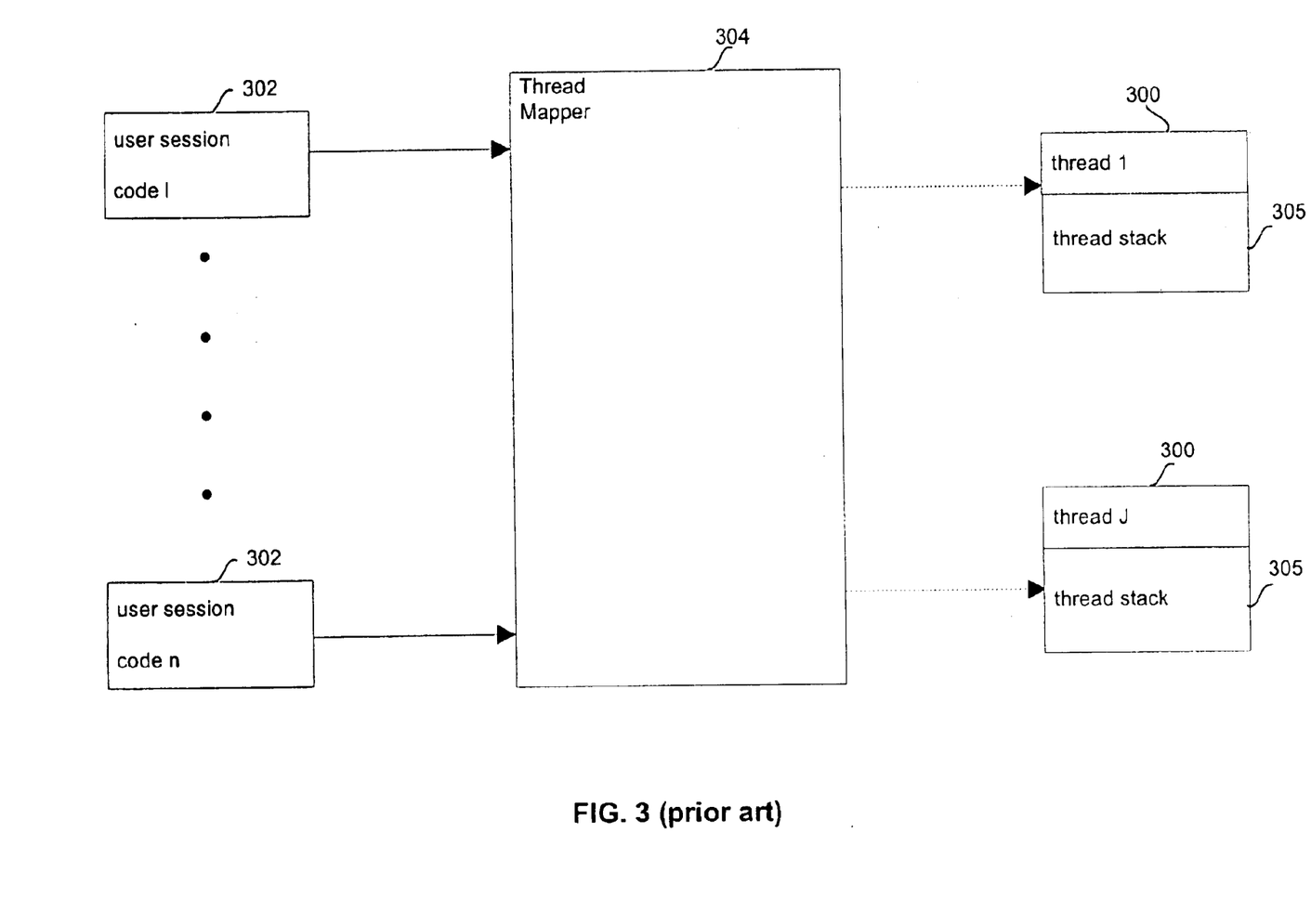
FIG. 3 illustrates a prior art thread system.

FIG. 3 is a more detailed block diagram of a conventional thread system. A user session 302 is mapped by a thread mapper 304 onto an individual thread 300. Each thread 300 is allocated sufficient stack space 305 to handle any function the thread may execute. Consequently, for a thread pool having a total of J threads, where J is an integer, the total stack space allocated to the threads is the summation of the stack space allocated to each of the J threads.

Figure 2:
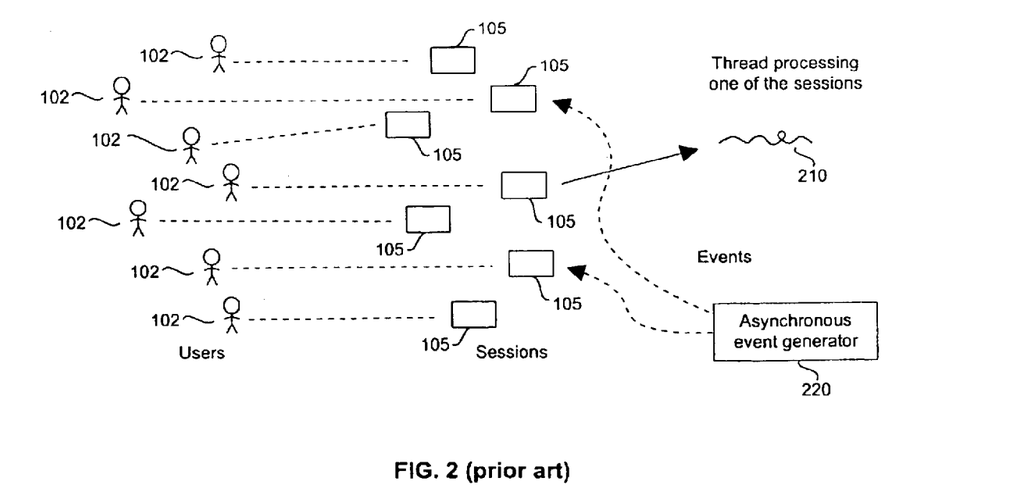
FIG. 2 illustrates a prior art method to asynchronously execute user session in a threaded system.

An alternative conventional approach is the asynchronous event-based session shown in diagram of FIG. 2. For the purposes of illustration, a single thread 210 is shown for executing each user session 105 of a group of simultaneous users 102. The asynchronous event-based session model has the advantage of reducing the time threads spend blocked but at the cost of a more complex programming model in which each session object is a state machine. In the asynchronous model the session objects must encode state transitions to permit a switch from a blocked session to another session. If a thread encounters a potentially blocking operation, such as an I/O operation, it records the current state of the session, suspends the current session, and goes on to pick up another session that needs to be processed. When the blocking operation finishes, the system generates an asynchronous event via asynchronous event generator 220 that marks the session runnable again. Each thread thus only blocks if there are no runnable sessions. This means that a small number of threads (e.g., one thread) can support a larger number of sessions.

The asynchronous model of FIG. 2 works well for systems with stable and well defined protocols with well-defined state transitions, such as Internet firewalls and proxies. However, the programming model can comparatively complex because of the need to preserve state transition information. Moreover, if a new feature is added to the program, new states may have to be added to the state transition diagram. This can greatly increase the work required to upgrade a program, add new features, or modify existing features. The result is that the asynchronous model of FIG. 2 is both more difficult to program and more difficult to upgrade compared with the thread model of FIG. 1.

Conventional thread techniques thus do not have all of the desired features for handling a large number of user sessions. The thread-based model of FIG. 1 is comparatively simple to program, but has problems with scalability, particularly if the threads are blocked because of I/O operations. Additional threads 110 can be added to the thread pool but there are significant system penalties associated with increasing the number of threads 110. This can limit the ability of a network device (e.g., a server or network appliance) to handle a large number of simultaneous sessions. The asynchronous event-based model of FIG. 2 is highly scalable, but requires that the state of each session be recorded for blocked threads. This makes the asynchronous model more difficult to program and upgrade.

Therefore, there is a need for an new thread programming technique that is highly scalable and comparatively simple to program and upgrade.

SUMMARY OF THE INVENTION

The present invention permits a reduction in the stack memory allocated to a computer thread, which reduces the system penalty when large numbers of threads are used. In the present invention, each segment of program code to be run on a thread, such as the program code for executing an active network session, is classified based upon the stack memory required to execute any function call within the segment. The stack memory allocated to the thread is preferably sufficient to handle the requirements of a first class of function calls. The computer thread utilizes an auxiliary stack resource to execute program code function calls requiring substantial stack memory resources and reclaims the auxiliary stack resource when it is no longer necessary to execute the code of the segment. In a wrapper embodiment, segments of the program code of a class having function calls requiring substantial stack resources are wrapped in a wrapper that calls an auxiliary stack resource for executing the function call and in which the wrapper returns the auxiliary stack resource when the function call is completed. The auxiliary stack resource may be a shared stack or a new stack from a pool of stacks.

The figures depict a preferred embodiment of the present invention for purposes of illustration only. One of skill in the art will readily recognize from the following discussion that alternative embodiments of the structures and methods disclosed herein may be employed without departing from the principles of the claimed invention.

DETAILED DESCRIPTION OF THE PREFERRED EMBODIMENTS

Figure 4A:
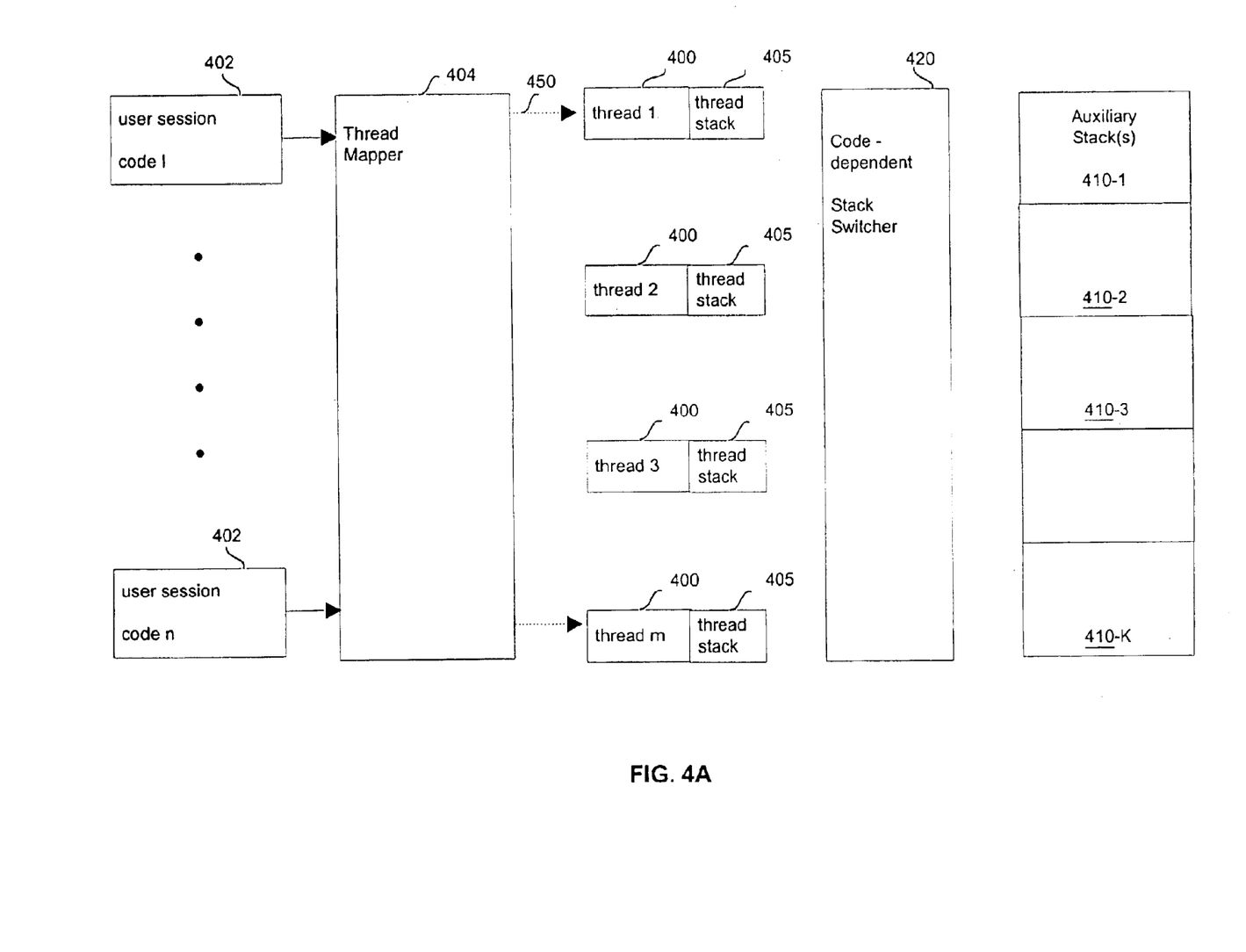
FIG. 4A illustrates a thread system of the present invention in which auxiliary stack resources are called to handle peak stack memory requirements of complex function calls.

FIG. 4A illustrates one aspect of the present invention. The program code of a user session 402 is mapped to a thread 400 by a thread mapper 404. The program code may include one or more function calls. Each function call may require a different amount of stack memory space. Consequently, during the execution of a single user session by one thread 400 the instantaneous stack resources required will depend upon the function call of the program code segment presently being run by thread 400.

Each thread 400 preferably includes a comparatively small amount of stack memory 405 scaled to handle the requirements of a first class of program code defined as being a code type that requires comparatively small amounts of stack space for its execution. An auxiliary stack 410 is called whenever the program code type being executed by thread 400 is of a second class, the second class being defined as being of a code type that requires larger amounts of stack space for its execution. This is illustrated in FIG. 4A by code-dependent stack switcher 410, which calls an auxiliary is stack 410 whenever the code is of a class requiring large stack memory resources.

Figure 4B:
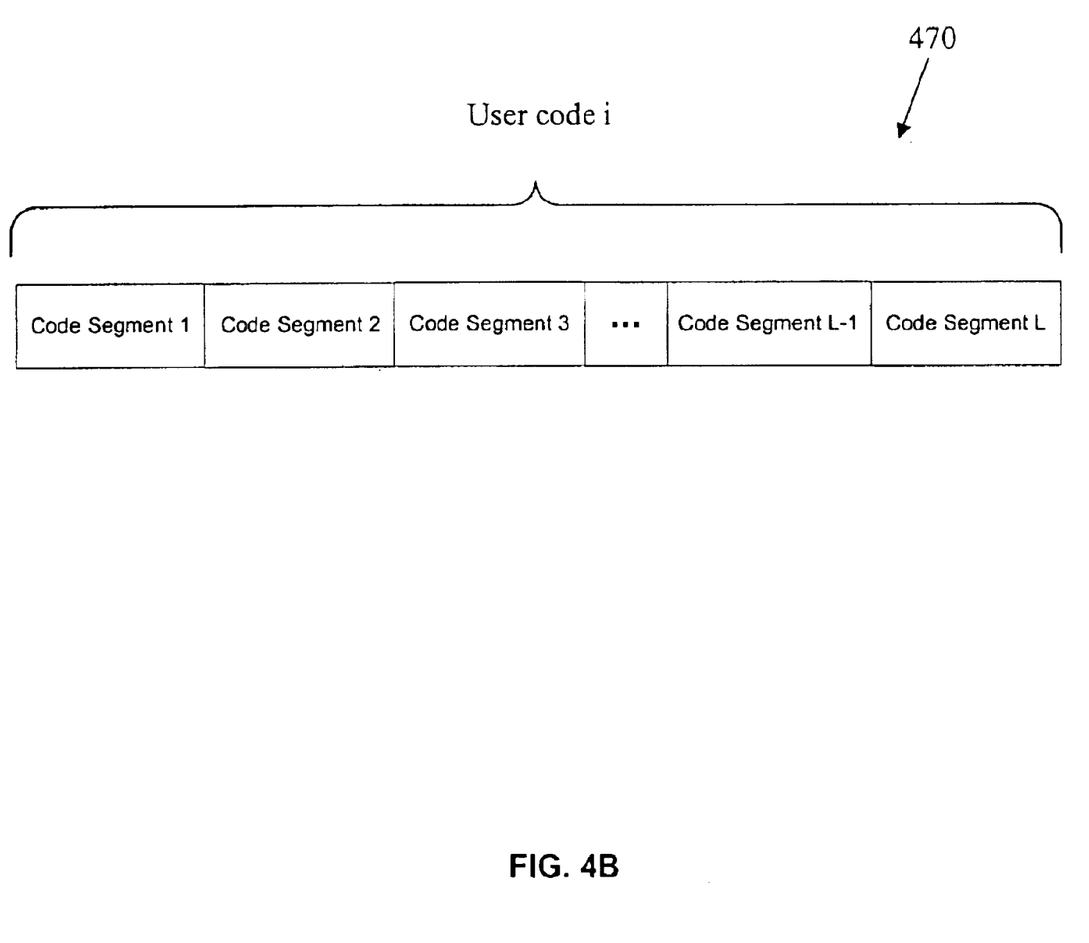
FIG. 4B illustrates a program code having code segments.

As shown in FIG. 4B, a user code 470 may be divided into small code segments.

Figure 4C:
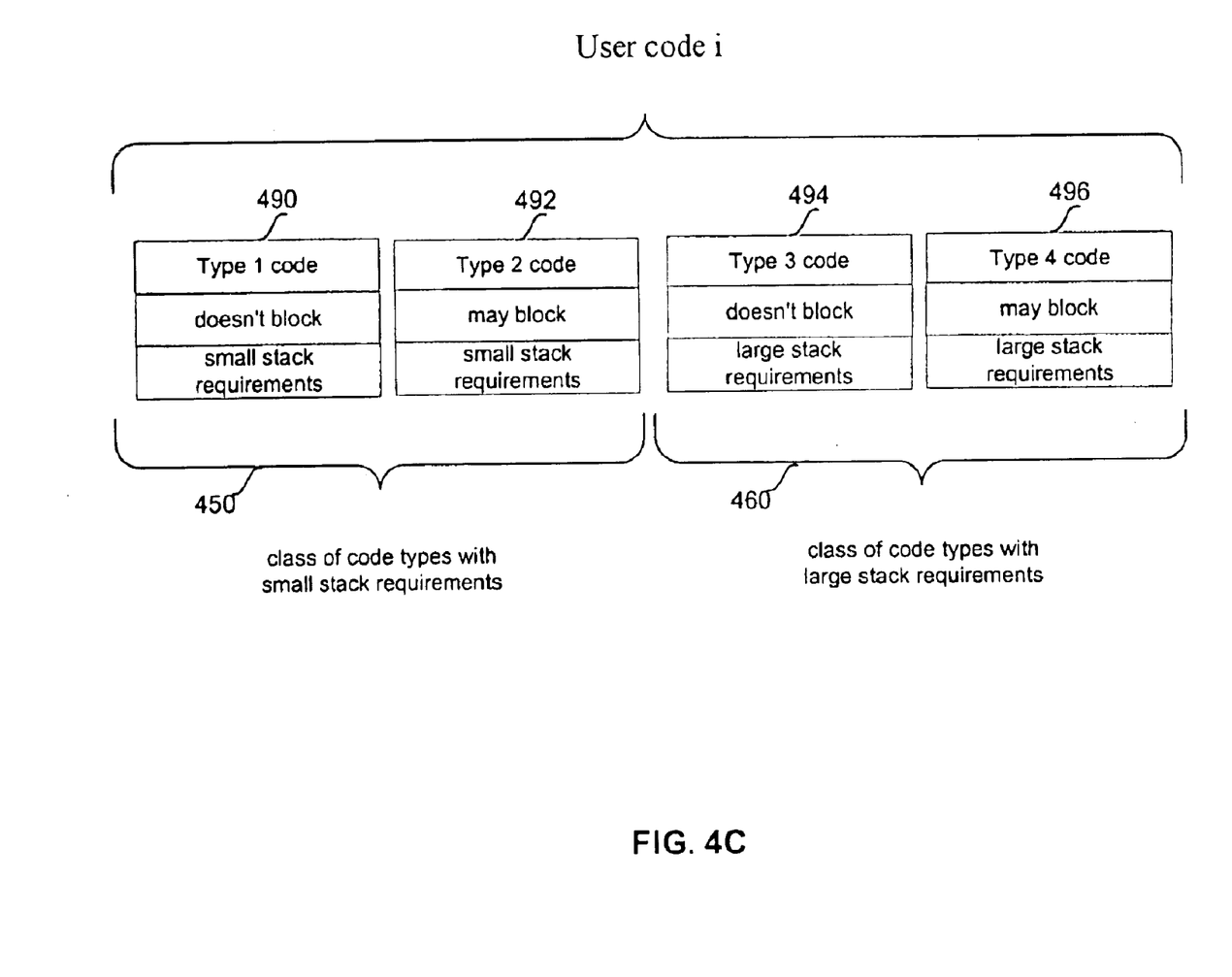
FIG. 4C illustrates a classification in which code is classified into two classes and four types.

As shown in FIG. 4C, user code 470 may be further divided into two classes of segments, a first class 450 having a comparatively small stack memory requirements and a second class 460 having a larger stack memory requirement. First class 450 may be further divided into two types, corresponding to a code type that doesn't block 490 and a code type that may block 492. Second class 460 may also be further divided into a code type that doesn't block 494 and a code type that may block 496.

Figure 5:
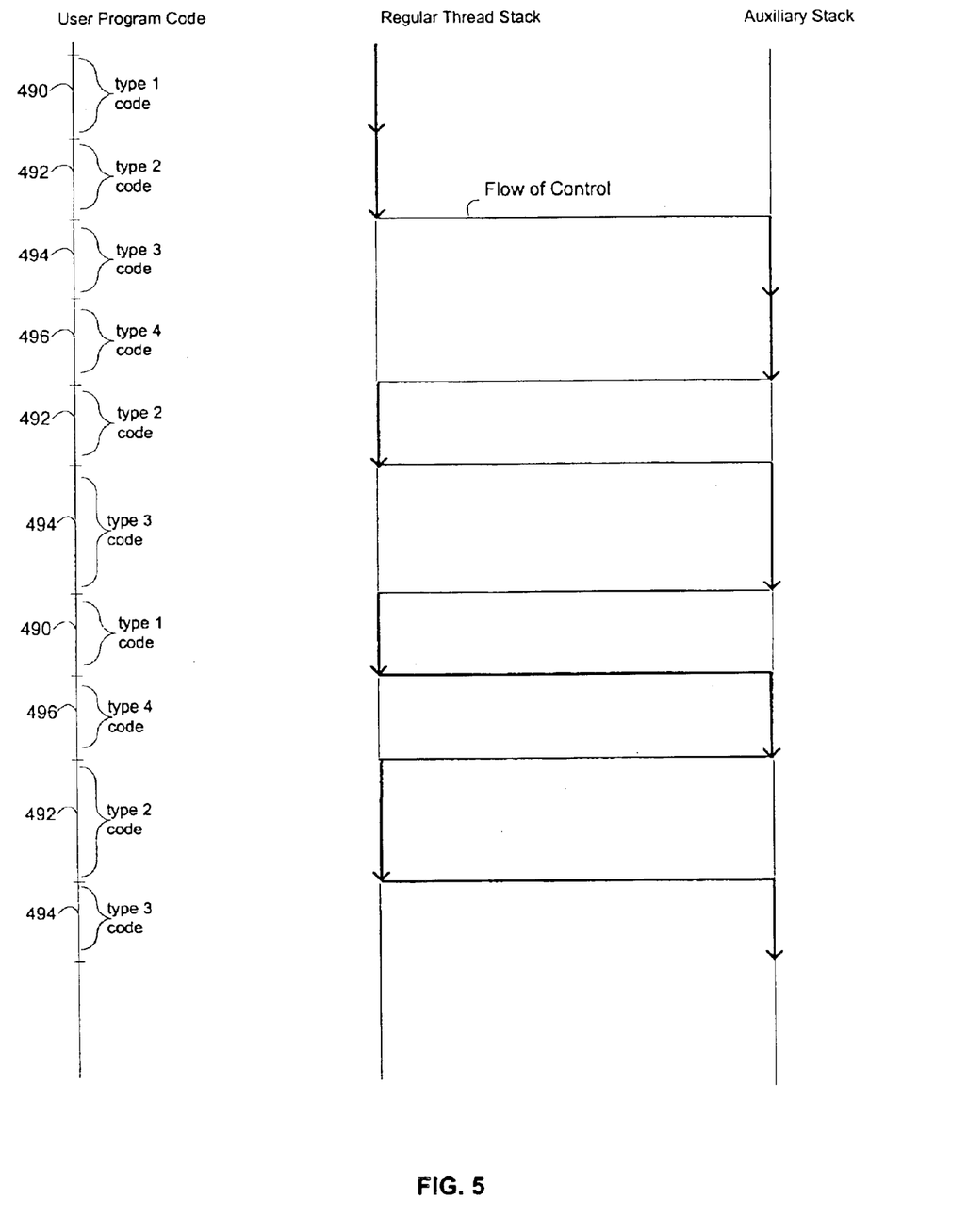
FIG. 5 illustrates the flow of control in the system of FIG. 4A for different code types.

FIG. 5 shows a flow of control for the system of FIG. 4. When the code type is of the first class, i.e., types 490 and 492, the regular thread stack 405 is used by the thread to execute the program code. However, if the code type is of the second class, i.e., types 494 and 496, auxiliary stack 410 is called to execute the program code.

Figure 4D:
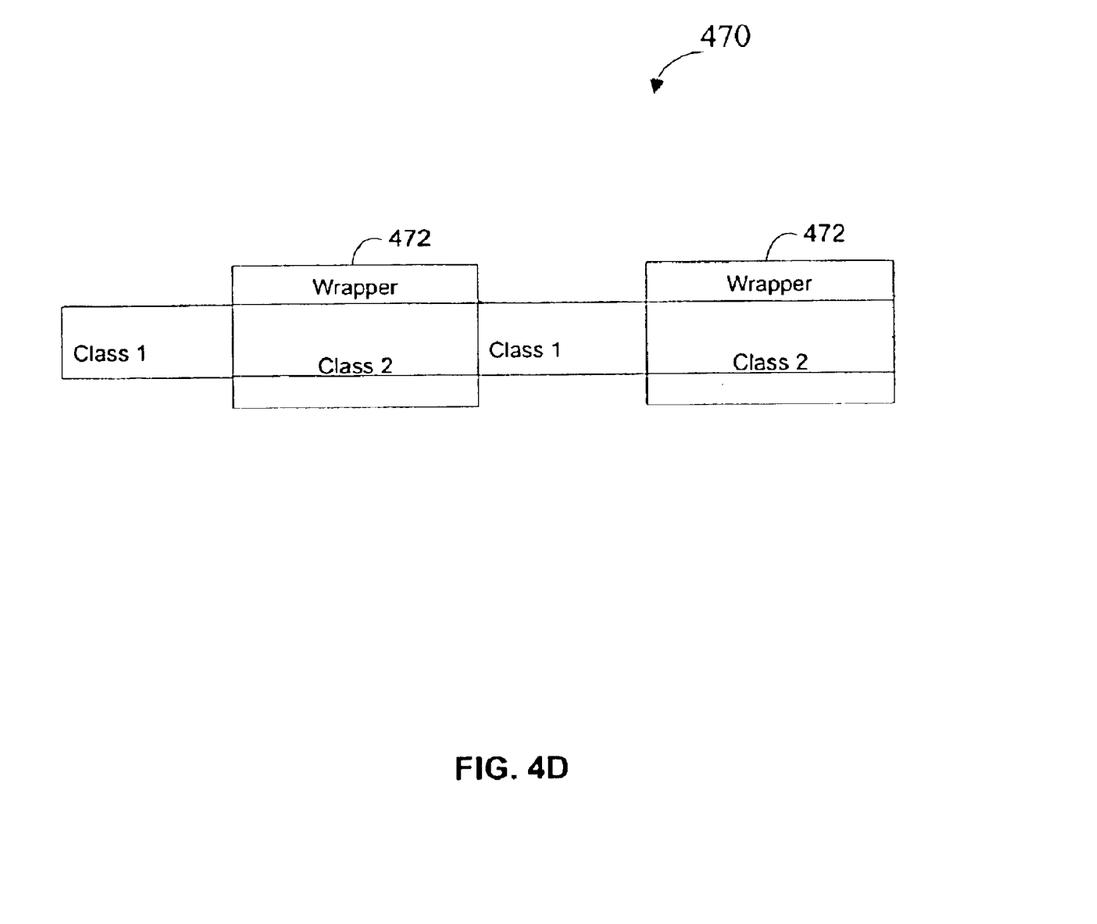
FIG. 4D illustrates a program code in which program segment of a class requiring large stack resources are wrapped in a wrapper to call an auxiliary stack.
Figure 6:
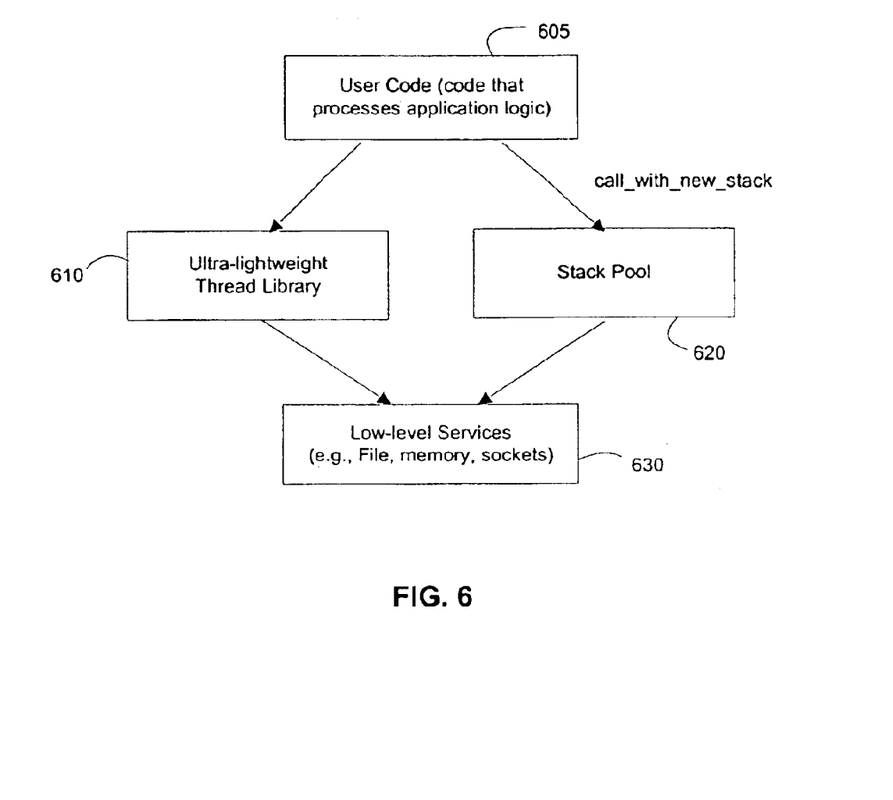
FIG. 6 illustrates a thread system in which a call is made to a new stack to execute a function call.
Figure 7:
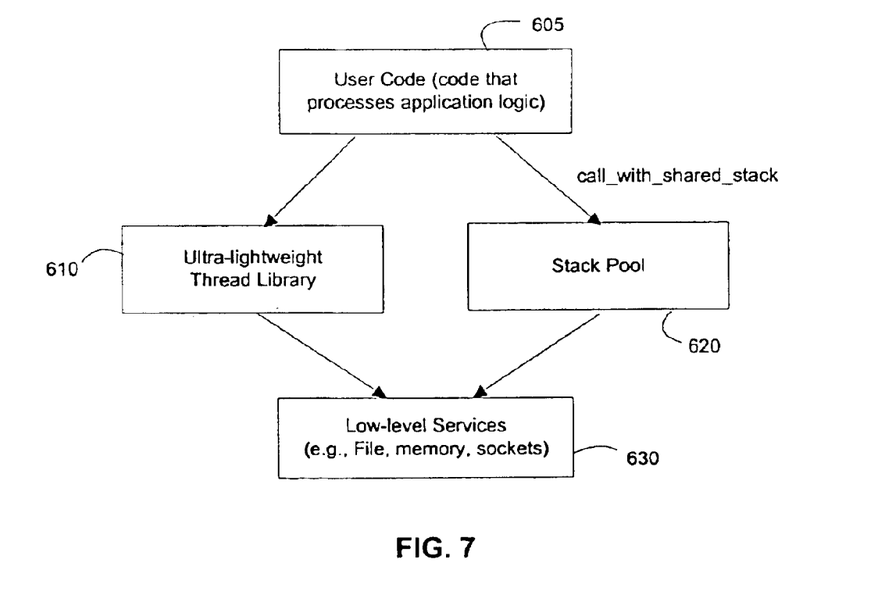
FIG. 7 illustrates a thread system in which a call is made to a shared stack to execute a function call.

As shown in FIG. 4D, a preferred implementation of a stack switcher is a wrapper 472 for user code segments of the second class, with the wrapper adapted to call auxiliary stack resources sufficient to execute the wrapped function. FIG. 6 is a functional block diagram of one embodiment of the present invention in which a wrapper is used to call the auxiliary stack. User code 605, such as that for executing an active user session, has program code of the second class wrapped in a wrapper configured to call the auxiliary stack resource that is a new stack in a pool of stacks. If the function call of the code is of a code type in the class requiring large stack memory resources, a wrapper in the user code makes a call to a new stack from a stack pool 620 to execute the function call required to provide the desired service 630. FIG. 7 shows an is alternate embodiment in which the wrapper makes a function call to a shared stack 720 to execute a user code of a type requiring a comparatively large stack memory space.

One aspect of the present invention is the dynamic allocation of stack memory in accord with the stack memory requirements of different types of function calls required to execute an active session. As shown in FIG. 5, whenever a function requiring substantial stack space (e.g., code of the second class 460, corresponding to code types 494 and 496) needs to be executed, an auxiliary stack 410 is called to execute the function and the auxiliary stack is reclaimed when the function is completed. Note that a reclaimed auxiliary stack 410 may be used by another thread, i.e., an auxiliary stack 410 may be multitasked to service more than one thread 400. Consequently, stack memory is utilized more efficiently than for a conventional thread 300 in which each thread 300 is allocated sufficient fixed stack memory 310 to handle any function call that the thread may be required to execute in an active session.

As described above, a wrapper 472 is the preferred implementation of the stack switcher 420 used to call auxiliary stack memory space for the second class 460 of code types requiring substantial stack memory resources. Classification of code types into the first class 450 and the second class 460 can be performed in several different ways. Many programming languages include hundreds or even thousands of different function calls. The stack memory required for a thread to execute a particular function may be: 1) estimated based upon the nature of the function call performed by the code; or 2) empirically tested to form a table of the stack memory requirements of a particular function.

Additionally, the stack usage of a function can be estimated using an iterative dataflow method. An exemplary iterative dataflow method to estimate stack usage utilizes two loop levels. The stack usage of a function in a program code segment, P, can be conservatively estimated (e.g., the estimate may be higher than the actual usage, but not lower) using the following iterative data flow process. Assume that a program code segment, P, comprises functions {F1, F2, . . . , Fn}. First, the stack usage of all functions is set to 0. Two loops are utilized, a level 1 loop and a level 2 loop. The level 1 loop repeatedly executes a level 2 loop until the inferred stack usage of {F1, F2, . . . Fn} no longer changes, i.e., the process converges on an estimate of the inferred stack space. The level 2 loop performs for each function, F, in {F1, F2, . . . , Fn} the following steps:

If F is a leaf function, the amount of stack F uses is inferred to be the sum of amount of storage needed by its local variables.

If F is not a leaf function, the amount of stack F needs is inferred to be the sum of storage needed by its local variables and the currently inferred stack space needed by other functions called by F. Calls to unknown functions (such as a function pointer bound at runtime) are assumed to require infinite stack space. When the above iterative process converges, the inferred stack space for each function is either a finite number which is a conservative estimate of the stack space needed by the function, or infinite (should the function call make calls to one or more unknown functions).

For the purpose of classifying code segment into classes based upon stack space requirements, a first stack memory level for thread stack memory 405 needs to be is selected. This may be done in a variety of ways, including: 1) estimating a first stack memory level for which the majority of functional calls may be executed; 2) using statistical techniques to estimate a first stack memory level for which a preselected fraction of all function calls may be executed; or 3) using empirical or semi-empirical techniques to select a first stack memory level that results in the reduction of total stack memory requirements. A second stack memory level of the auxiliary stack 410 may be selected using a variety of techniques, such as: 1) estimating a second stack memory level for which any function call may be executed; and 2) using techniques to adjust the allocation of stack memory to auxiliary stack 410 to handle any function call of code of the second class.

Each segment of program code may be classified into a first class 450 having two types 490 and 492 and a second class having two types 494 and 496. The code types are summarized in TABLE 1, below. Type 1 code processes are types of code in which the thread 400 executes function calls that require insignificant stack memory resources and in which the thread does not block. Type 2 code processes are code types in which the thread executes function calls that require insignificant stack memory resources and in which the thread may be blocked. Type 3 code processes are code types in which the thread executes function calls that require significant stack memory resources and that do not become blocked. Finally, Type 4 code processes are processes in which the thread executes function calls that require significant stack memory resources and that may block.

TABLE I

Table of code types.

| STACK USAGE | DOESN'T BLOCK | MAY BLOCK |
| --- | --- | --- |
| Code requires insignificant stack resources | Type 1 (e.g., simple library function calls) | Type 2 (e.g., direct system call) |
| Code requires significant stack resources | Type 3 (e.g., complex functions) | Type 4 (e.g., complex functions) |

Examples of type 1 code processes include a sequence of code that does not perform a function call or a sequence of code that includes calls to simple library functions, such as the Unix program language functions strcmp or memcpy. In most programming language there are only a comparatively small number of type 1 code processes.

Type 2 code does not require significant stack space but may block. This type of code may, for example, be a direct system call or a simple wrapper around a system call. In the Unix program language, for example, there are 25 system calls that may block, including: open, creat, close, read, readv, write, writev, poll, select, pipe, fcntl, ioctl, dup, to dup2, socket, accept, connect, recv, rcvfrom, recvmsg, send, sendto, sendmsg, gethostbyname, and gethostbyaddr. These exemplary Unix blocking functions are interposed by threads, i.e., all calls to the function are redirected through a wrapper. The wrapper registers the call with the thread package and suspends the current thread. The thread package then carries out the call and resumes the execution of the thread that initiated the call. An asynchronous event mechanism may be used to implement these blocking calls. Thus, a thread issuing these blocking calls does not consume an additional amount of stack space and simply blocks until the thread finishes the call.

Type 3 code corresponds to processes that consume a significant amount of stack space during a portion of their execution but which do not block. Examples are code processes that contain calls to complex functions, such as recursive functions, that may require a large amount of stack to execute the function. One way to reduce the stack memory required for the thread is by the use of auxiliary stack resources for executing the complex function. The arguments from the current stack of the thread are copied over to the auxiliary stack resources, the function is invoked, and the result is copied back to the current stack of the thread. As described below in more detail, the auxiliary stack resource may be an alternate stack or a stack pool, depending upon whether the thread operates preemptively or cooperatively.

As one example, consider a pre-emptive thread having a function that requires substantial peak stack resources. Referring to FIG. 6, a thread may obtain a new stack from a pool of stacks, copy over the arguments, invoke the function, copy back the result, and return the stack to the pool of stacks. As an illustrative example, suppose that a thread executes a program code segment that calls the Unix function malloc. Malloc is a function that may invoke complex internal memory operations, such as compacting the memory or requesting more memory from the operating system. Consequently, using conventional thread techniques, malloc typically requires that a large amount of stack space be reserved, resulting in a heavy thread. However, in accord with one embodiment of the present invention, the thread package to execute the malloc function is written as a function called call_with_new_stack that is used wrap every cell of malloc. For example, the code process:

Result=malloc(size);

Can be re-written as the wrapped function:

Result=call_with_new_stack (malloc, size).

The call_with_new_stack function wrapper may be implemented in a variety of different program languages as a function that creates a new stack of memory from a memory pool. The following Linux/Intel x86 assembly code segment is an example of how call_with_new_stack may be implemented:

1. call_with_new_stack:
2. pushl % ebp
3. movl % esp,% ebp
4. call alloc_stack
5. pushl % eax
6. movl % eax,%esp
7. addl $SHARED_STACK_SIZE,%esp
8. pushl 44(%ebp)
9. pushl 40(%ebp)
10. pushl 36(%ebp)
11. pushl 32(%ebp)
12. pushl 28(%ebp)
13. pushl 24(%ebp)
14. pushl 20(%ebp)
15. pushl 16(%ebp)
16. pushl 12(%ebp)
17. movl 8(%ebp),% eax;
18. call *%eax
19. addl 36,%esp
20. movl %eax,%ebx
21. call free_stack
22. movl % ebx,% eax
23. leave
24. ret.

The above code segment works as follows:
1) it saves the stack pointer % esp (lines 2–3);
2) it calls alloc_stack to allocate a stack segment (line 4);
3) it saves the returned stack address so that it can be freed later at line 21 (line 5);
4) it resets the stack pointer to the new stack (lines 6–7);
5) it copies up to 9 arguments from the current stack to the new stack (lines 8–16); 5) it calls the target function (lines 17–18);
6) it pops off the 9 arguments so that the stack top points to the saved stack segment (line 19);
7) it saves the result of the target function call in %ebx. (line 20);
8) it frees the stack segment by calling free_stack (line 21);
9) it restore the target function call result (line 22); and 10) it returns the target function call result (lines 23–24).

The functions alloc_stack and free_stack implement a memory pool of stack segments:

void* alloc_stack(void);
void free_stack(void* stack);

Note that type 3 thread is non-blocking, which means that the function call will not be blocked. Consequently, the new stack will be used to execute the function and be reclaimed to the pool of stacks after the function is executed on the new stack. This means that the number of stacks in the pool of stacks may be much smaller than the number of type 3 threads, particularly if the thread executes the complex function (e.g., malloc) during only a portion of the process executed by the thread.

Referring to FIG. 7, if the thread package is non-preemptive, a shared auxiliary stack segment 410 may be used instead of a stack pool. The non-blocking nature means that type 3 code will not result in a context switch. A shared alternate stack function can be wrapped in the wrapper code:

call_with_shared_stack.

As an example of a shared stack wrapper implementation is the following Linux/Intel x86 assembly code segment:

1. Call_with_shared_stack:
2. Pushl %ebp
3. movl %esp, %ebp
4. movl $shared-stack, %esp
5. addl $shared_stack_size, %esp
6. pushl 44 (%ebp)
7. pushl 40 (%ebp)
8. pushl 36 (%ebp)
9. pushl 32 (%ebp)
10. pushl 28 (%ebp)
11. pushl 24 (%ebp)
12. pushl 20 (%ebp)
13. pushl 16 (%ebp)
14. pushl 12 (%ebp)
15. movl 8 (%ebp), %eax;
16. call *%eax
17. leave
18. ret.

The above code segment performs the following function:

1) saving the stack pointer, %esp (lines 2–3);
2) resetting the stack pointer to the shared large stack (lines 4–5);
3) copying up to six arguments from the current stack to the new stack (lines 6–14);
4) calling the function (lines 15–16); and
5) switching back the stack and returning the result (lines 17–18).

Type 4 code may consume a large amount of stack space and may also block. Examples of type 4 code are code segments that contain calls to complex functions, such as recursive functions, that may in turn call blocking functions. As in type 3 threads, auxiliary stack resources may be used to execute the complex function using a wrapper. Because type 4 code blocks, a call_with_new_stack wrapper for calling a new stack from a stack pool is preferably used.

Figure 8A:
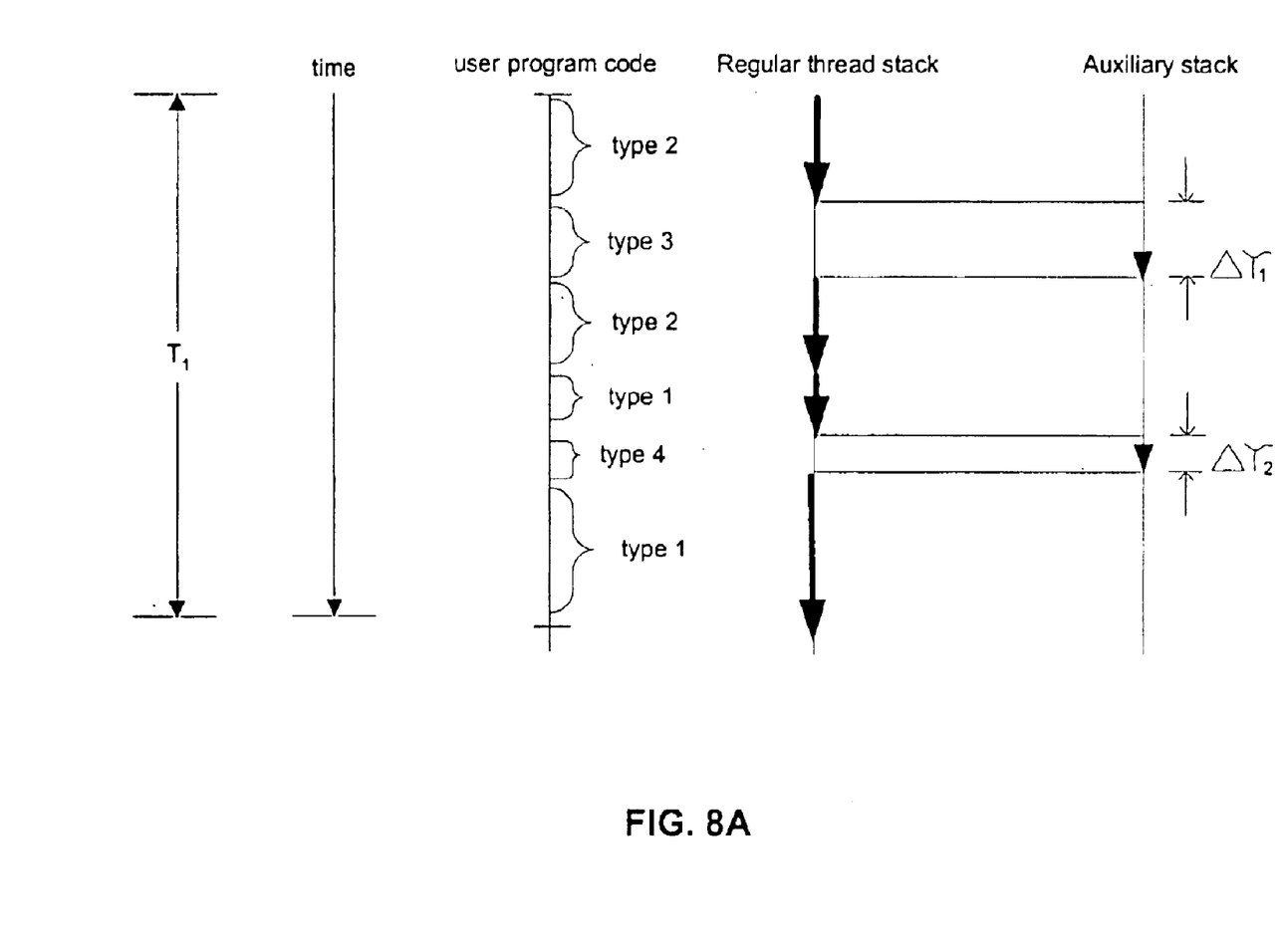
FIG. 8A illustrates the flow of control for an exemplary program code.
Figure 8B:
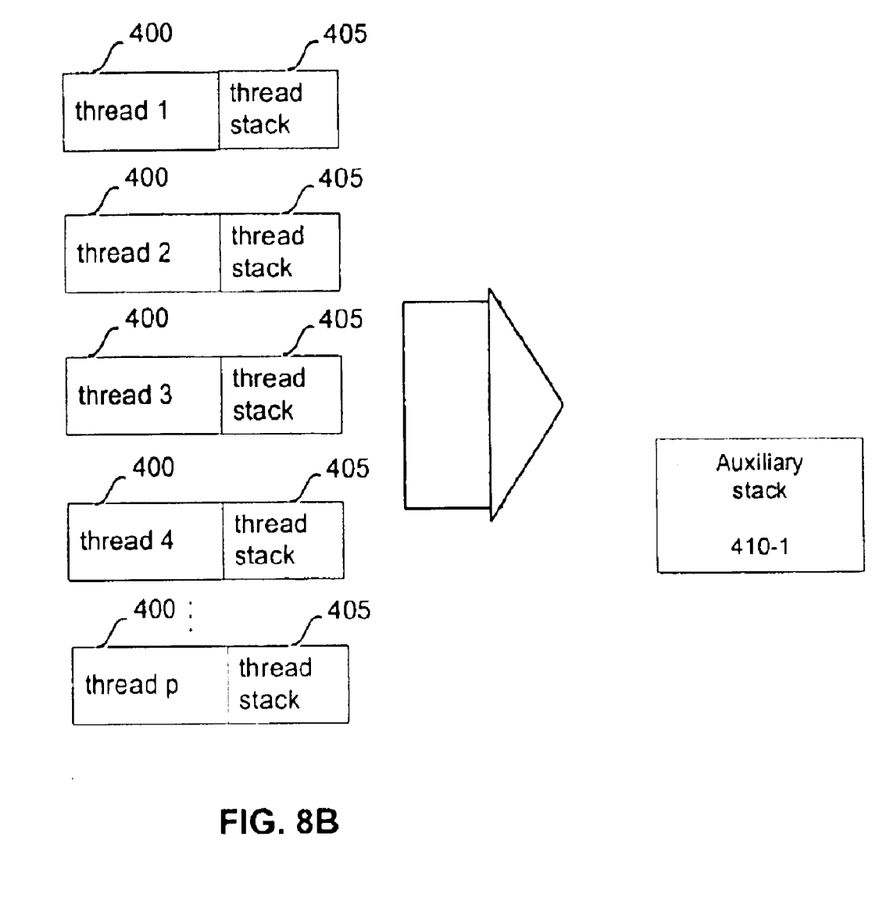
FIG. 8B illustrates how a single auxiliary stack can be multitasked to service several threads.

Type 4 code may also be advantageously re-written. With reference to FIG. 8A, the flow control of a user program code will spend a fraction of time, f, using the auxiliary stack that depends on the fraction of time that type 3 code executes and the fraction of time that type 4 code either executes or is blocked. With reference to FIG. 8B, an auxiliary stack 410 can be multitasked to service a large number of threads 400. Note that type 4 code may spend a significant period of time blocked. This means that type 4 code tends to hold onto the auxiliary stack 410, thereby reducing the number of threads that can be multitasked from one auxiliary stack 410. There is a significant benefit to re-writing type 4 functions as type 3 functions, i.e., converting comparatively simple type 4 blocking functions into type 3 non-blocking functions. Alternately, if the code cannot be rewritten to eliminate the blocking function, in some cases the code can be rewritten to have a reduced blockage time. Consequently, in a preferred embodiment, code having the longest potential blockage time is re-written to reduce the blockage time.

Referring again to FIGS. 8A and 8B, is also desirable to alter the program code to reduce the number of function calls that require a large size for auxiliary stack 410. The amount of stack memory space allocated for the auxiliary stack resources can be beneficially reduced by designing programs to minimize stack memory requirements during part or all of their execution. Programming techniques to reduce stack space usage include turning large stack allocated variables into heap allocated variables and turning recursive algorithms into iterative algorithms.

Figure 9:
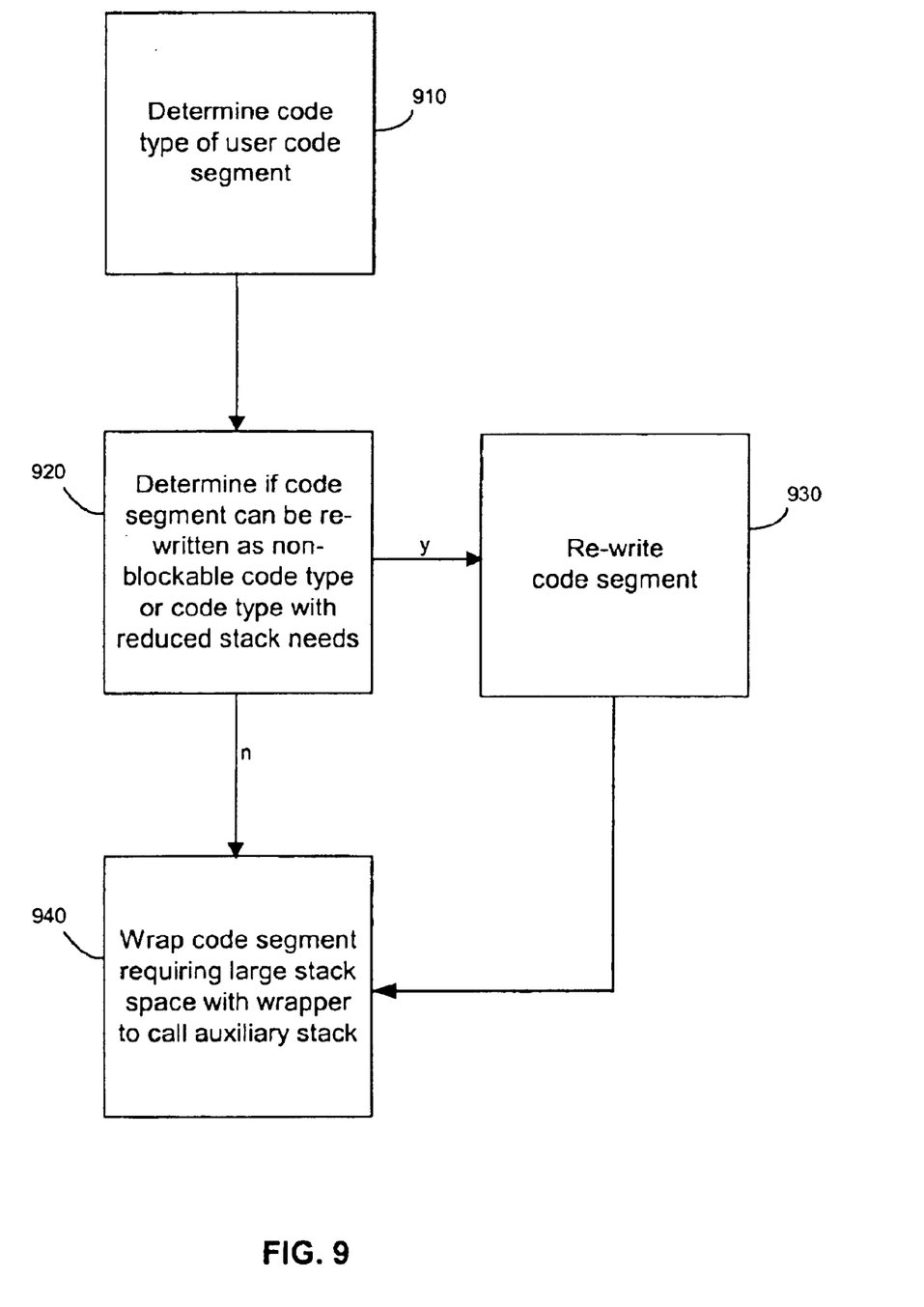
FIG. 9 is a flow chart for programming user code.

FIG. 9 is a flow chart of an algorithm for programming user code. First each segment of the user code is classified 910 into the four code types 490, 492, 494, or 496.

A determination 920 is preferably made whether the code is of a type that can be replaced with a more efficient alternative, such as replacing a type 4 blocking code with non-blocking code or replacing a recursive function with one using an iterative technique. If the code type can be beneficially rewritten, the code segment is modified 930. If the code segment is of type 3 or type 4 (second class) it is appropriately wrapped 940 to call an auxiliary stack. Process 900 can be implemented manually but is preferably implemented using a supervisory program having a database of code types and a set of rules for modifying the code segment 930.

A supervisory program to implement the method of FIG. 9 may characterize each program code function call by running the function on a real or virtual system to determine the stack memory requirement of the function and whether the function is blocking or non-blocking. This information can be stored in a database. Appropriate wrappers for each function call can also be stored in the database for each function that can advantageously use the auxiliary stack memory. A supervisory program may be programmed to automatically select an appropriate wrapper for each code segment of the second class 460. Additionally, the supervisory program may also store a database of function substitutions for type 4 blocking code that requires a large stack space or which blocks for a long period of time and make an appropriate replacement 930.

If a supervisory program is not used to automatically classify the code type of each segment of user code, the thread technique of the present invention requires that the code type (e.g., type 1, type 2, type 3, or type 4) be taken into account when programming the code in order to select an appropriate wrapper. The code type should also be taken into account in deciding whether to re-write the code to reduce potential blockage or to alter the function call to reduce stack memory requirements. The extra complexity increases the programming difficulty and chance for errors (e.g., using the wrong wrapper for a particular type of code or mistaking a blocking function for a non-blocking function). Several approaches may be used to reduce the chance of a programming error. One approach is to use a naming convention for functions that correspond to a particular code type. This allows the code type to be tracked by name. Run-time assertion check can also be used assist in catching code type errors.

Still another approach is to leverage built-in features of the programming language to reduce the chance of a human error occurring during the programming of the code. For example, if the programming language supports checked exceptions, such as JAVA, different types of code may be declared to throw different classes of checked exceptions.

For example, functions that block may be declared such that they always take a particular type as an argument. These functions can then only be called in contexts where a variable of such type is available. Functions that block and use stack may throw a BlockingException. For example, method f in class c may be declared as:

class C {
  f( ) throws BlockingException { . . . };
  . . . }

Now any method that uses c.f will either: also throw BlockingException indicating the method also blocks and uses the stack, or have to catch and handle BlockingException explicitly. A blocking exception provides that the benefit of ensuring that an appropriate wrapper, such as call_with_ new_stack, is used every time BlockingException is handled.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computer implemented method of allocating stack memory for a process for executing a computer program code, the method comprising:

mapping an active session of the code to a thread of concurrent threads executing requests of user sessions, the thread having a fast stack memory selected to execute a first class of code having a first pre-determined stack memory size requirement, the first stack memory corresponding to the pre-determined stack memory size requirement;

responsive to a function call of a code segment of the code being of the first class, executing the code segment with the first stack memory; and responsive to the function call of the code segment being of a second class of code having a second pre-determined stack memory requirement that is greater then the first stack memory size requirement, executing the function call of the code segment in a pre-determined auxiliary stack memory corresponding to the second stack memory size requirement to execute the code segment, and reclaiming the auxiliary stack memory subsequent to executing the function call of the code segment.

2. The method of claim 1, wherein the function call of the code segment is of the second class and includes a wrapper configured to call the auxiliary stack memory to execute the function call.

3. The method of claim 2, wherein the thread is non-preemptive, the auxiliary stack memory is a shared stack, and the wrapper performs the operations of:

saving a stack pointer to the first stack;
resetting the stack pointer to the shared stack;
copying arguments from the first stack to the shared stack;
calling a program function of the function call;
returning the result to the first stack of the thread; and
returning the shared stack.

4. The method of claim 2, wherein the thread is preemptive, the auxiliary stack is a new stack from a pool of stacks, and the wrapper performs the operations of:

saving a stack pointer to the first stack memory;
allocating a new stack segment having a slack address;
saving the stack address of the new stack segment;
resetting the stack pointer to the new stack segment;
copying an argument from the first stack to the new stack;
calling a program function of the function call;
returning the result of the program function to the first stack memory; and
returning the new stack segment.

5. The method of claim 1, further comprising:
allocating a preselected stack memory space for the auxiliary stack memory.

6. The method of claim 1, further comprising: allocating the stack memory for the auxiliary stack memory space as requited to satisfy the stack memory size requirements of the function call.

7. The method of claim 1, wherein each of the classes includes a code type that is blockable and a code type that is non-blockable.

8. The method of claim 7, wherein the code types are identified by a naming convention.

9. A method of reducing stack memory resources in a computer system that executes concurrent user sessions, the method comprising:

mapping an active session having a program code to a thread of concurrent threads executing requests for user sessions, the thread having a first stack memory space allocated to the thread selected to handle a first class of function calls, the first class of function calls having a first pre-determined stack memory size requirement, the first stack memory space corresponding to the first pre-determined stack memory size requirement; and responsive to the program code invoking a function call of a second class of function calls having a second pre-determined stack memory size requirement that is greater than the first stack memory size requirement;

transferring the execution of the program code from the first stack memory space to a pre-designated auxiliary stack memory space having a stack memory size greater than the first stack memory;

executing the function call on the auxiliary stack memory space, the auxiliary stack memory space corresponding to the second pre-determined stack memory size requirement;

copying a result of the function call to the first stack memory of the thread; and reclaiming the auxiliary stack memory space.

10. The method of claim 9, wherein the auxiliary stack memory is a stack selected from a pool of stacks residing in the memory pool.

11. The method of claim 9, wherein the auxiliary stack memory is a shared stack.

12. The method of claim 9, further comprising:
selecting the size of the auxiliary stack memory as a function of a code type of the function call.

13. The method of claim 9, further comprising: wrapping the program code in a wrapper to transfer the execution to the auxiliary stack memory.

14. The method of claim 13, wherein the thread is non-pre-emptive and, the wrapper performs the steps of:

saving a stack pointer to the first stack memory;
resetting the stack pointer to a shared stack;
copying arguments from the first stack to shared stack;
calling a function;
returning the result of the function to the first stack; and
returning the shared stack.

15. The method of claim 13, wherein the thread is pre-emptive and the wrapper performs the steps of:

saving a stack pointer to the first stack;

allocating a new stack segment having a stack address;
saving the stack address of the new stack segment;
resetting the stack pointer to the new stack segment;
copying the argument from the first stack to the new stack;
calling a function;
returning the result of the function to the first stack memory; and
reclaiming the new stack segment.

16. The method of claim 9, wherein the first class of function calls includes a code type that blocks and a code type that does not block.

17. The method of claim 9, wherein the second class of function calls includes a code type that blocks and a code type that does not block.

18. A method of programming a computer program code including function calls for execution by a thread with a default stack memory in a threaded computer system, the method comprising:
    prior to execution of the program code, identifying function calls of the program code requiring a stack memory size greater than the default stack memory size allocated to the thread of concurrent threads executing requests of user sessions;
    executing a function call other than the function calls identified as requiring a stack memory size greater than the default stack memory size allocated to the thread using the default stack memory; and
    wrapping each of the identified function calls with a wrapper configured to call pre-designated auxiliary stack memory to execute the identified function call.

19. The method of claim 18, further comprising:
    selecting the stack memory allocated to the thread sufficient to handle a first class of function calls.

20. The method of claim 19, further comprising the step of:
    selecting the size of the auxiliary stack memory sufficient to handle a second class of function calls.

21. The method of claim 18, wherein the auxiliary stack memory is a new stack from a memory pool.

22. The method of claim 18, further comprising the step of:
    forming a shared stack as the auxiliary stack memory.

23. The method of claim 18, wherein the code includes a function cal having a recursive algorithm, further comprising:
    replacing the recursive algorithm with an iterative algorithm performing the same function, whereby the size of the stack required to execute the function is reduced.

24. The method of claim 18, wherein the function call includes a stack-allocated variable and further comprising:
    replacing the stack allocated variable with a heap allocated variable, whereby the size of the stack required to execute the function is reduced.

25. The method of claim 18, further comprising:
    identifying a program code segment that blocks substantially longer than other program segments; and
    replacing the program code segment with program code segment(s) performing the same function but selected to reduce the potential blockage time.

26. The method of claim 25, wherein a supervisory program having a database of program code segments is used to implement the method.

27. The method of claim 18, wherein each function call has a corresponding program code naming convention.

28. The method of claim 18, wherein the program code is executed in a program language having checked exceptions and the different classes of code are declared to throw different classed of checked exceptions.

29. The method of claim 18, further comprising the steps of:
    classifying different type of function calls into a classification based upon stack memory usage;
    preparing a database of wrapper functions, each wrapper function having a type of function call to implement the function call as a wrapped function calling the auxiliary stack memory; and
    assigning a wrapper to each function call based upon the classification.

30. The method of claim 28, wherein a computer assigns the wrapper.

31. The method of claim 18, further comprising the step of:
    characterizing at least one function by running the function on a real or virtual system to determine the stack memory required to execute the function.

32. The method of claim 19, further comprising:
    characterizing at least one function call by running the function on a real or virtual system to determine if the function is blocking or non-blocking.

33. A computer readable medium including program code for execution of a process in a computer system, the computer system having at least one computer thread of concurrent threads executing requests of user sessions having a first stack memory having a first stack size allocated to the thread and an alternate pre-designated stack memory space having a second stack size, the program code comprising:
    a computer program code having code segments of different code class, the code including a first class of code having a first pre-determined stack memory requirement of a first stack memory size for execution and a second class of code having a second pre-determined stack memory requirement of a second stack memory size for execution; and
    a wrapper wrapping each code segment of the second class configured to transfer execution of the function to the alternate stack memory space, wherein the alternate stack memory space is reclaimed subsequent to execution of the program code.

34. A computer system having an operating system for concurrently executing a plurality of user session requests, comprising:
    a computer program residing in a memory, comprising:
    a pool of concurrently running threads, each thread having a stack memory having a first stack size;
    a thread mapper mapping each user session onto one of the treads in the pool of threads;
    a pre-designated auxiliary stack memory having a second stack size, the second stack size being larger than the first stack size;
    a program code for executing one of the use sessions, the code including at least one code segment characterized by a code class of a plurality of code classes including a first class of code having a first pre-determined stack memory size requirement corresponding to the first stack memory and a second class of code having a second pre-determined stack memory size requirement corresponding to the auxiliary stack memory; and
    a wrapper for each code segment of the second class configured to transfer execution of a function of each code segment of the second class to the auxiliary stack memory, wherein the auxiliary stack memory is reclaimed subsequent to execution of a function.

\* \* \* \* \*

UNITED STATES PATENT AND TRADEMARK OFFICE
CERTIFICATE OF CORRECTION

PATENT NO. : 6,968,557 B1 Page 1 of 1
APPLICATION NO. : 09/740661
DATED : November 22, 2005
INVENTOR(S) : Hong Zhang It is certified that error appears in the above-identified patent and that said Letters Patent is hereby corrected as shown below:

Claim 1:
    Line 33, change "fast" to --first--
    Line 43, after "memory", insert --size--
    Line 44, change "then" to --than--
    Line 46, change "determine" to --designated--

Claim 6:
    Line 13, change "requited" to --required--

Claim 14:
    Line 57, change "elaim" to --claim--

Claim 23:
    Line 44, change "cal" to --call--

Claim 34:
    Line 49, change "treads" to --threads--
    Line 53, change "use" to --user--

Signed and Sealed this

Sixth Day of March, 2007

JON W. DUDAS
*Director of the United States Patent and Trademark Office*